United States Patent
Lally

(10) Patent No.: US 6,443,736 B1
(45) Date of Patent: Sep. 3, 2002

(54) TECHNOLOGY EXPLORER MODEL

(76) Inventor: Robert W Lally, 7 Eagle Hgts Dr., Orchard Park, NY (US) 14127

( * ) Notice: Subject to any disclaimer, the term of this patent is extended or adjusted under 35 U.S.C. 154(b) by 0 days.

(21) Appl. No.: 09/031,611

(22) Filed: Feb. 27, 1998

(51) Int. Cl.$^7$ ............................................. G09B 23/06
(52) U.S. Cl. ..................................... 434/300; 434/302
(58) Field of Search ........................... 434/1, 300, 302, 434/276; 446/490, 491; 73/1.37, 1.38, 1.39

(56) References Cited

U.S. PATENT DOCUMENTS

| | | | |
|---|---|---|---|
| 3,518,780 A | * | 7/1970 | Stewart et al. ........... 434/300 X |
| 3,626,605 A | * | 12/1971 | Wallace ................... 434/300 X |
| 3,629,957 A | * | 12/1971 | Somashekar ................ 434/302 |
| 3,650,048 A | * | 3/1972 | Michaud .................... 434/302 |
| 3,750,308 A | | 8/1973 | Nelson |
| 3,943,758 A | | 3/1976 | Wolf |
| 4,347,743 A | | 9/1982 | Rausche |
| 4,693,687 A | * | 9/1987 | Hwang ...................... 434/302 |
| 4,771,637 A | | 9/1988 | Kubler |
| 4,823,602 A | | 4/1989 | Christensen |
| 4,858,470 A | | 8/1989 | Kincaid |
| 4,905,518 A | | 3/1990 | Kubler |
| 5,044,206 A | * | 9/1991 | Willians .................. 434/302 X |
| 5,145,378 A | * | 9/1992 | Rott et al. ................... 434/302 |
| 5,289,722 A | | 3/1994 | Walker |
| 5,408,894 A | | 4/1995 | Henson |
| D367,675 S | | 3/1996 | Welch |
| 5,522,270 A | | 6/1996 | Gissinger |
| 5,523,644 A | | 6/1996 | Witehira |
| 5,526,208 A | | 6/1996 | Hatch |
| 5,601,433 A | * | 2/1997 | Potter ...................... 434/302 X |
| 5,675,089 A | | 10/1997 | Hawkins |

* cited by examiner

Primary Examiner—Sam Rimell

(57) ABSTRACT

An instrumented, adjustable, educational, structural model employs novel sensor housings and free-fall, pendulous, and cantilever-beam test objects made of stiff, hard, compressible material, for calibrating accelerometers; for demonstrating behavior-testing and health-monitoring machinery technology; and for exploring the radiant, vibrant, automatic, communicative nature and behavior of energetically interacting things. Unusual tests confirm Newton's Laws of Motion, and how energetic interaction causes things to happen and move. Somewhat surprisingly, sensor signals faithfully track the arcing motion of a glider type swing, but not that of a simple pendulous swing. Resulting from a dimensional interference fit, residual stresses in the compressible housing of a plug-in, motion sensor accurately align, secure and intimately clamp together imperfect mounting surfaces; and facilitate sensor assembly without the use of adhesives. Compression and expansion of a fluidic strain sensor converts surface distortion of a vibrating beam structure into an oscillating electrical signal for visual display on a monitor.

2 Claims, 5 Drawing Sheets

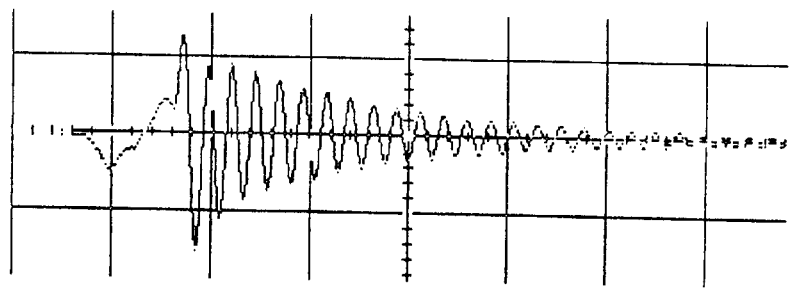
FIG. (8A)
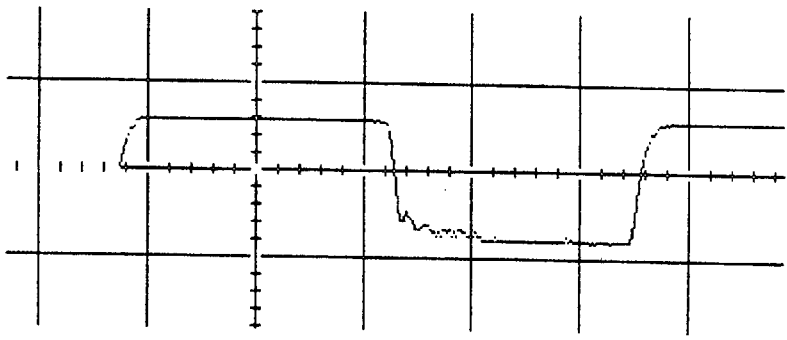
FIG. (8B)
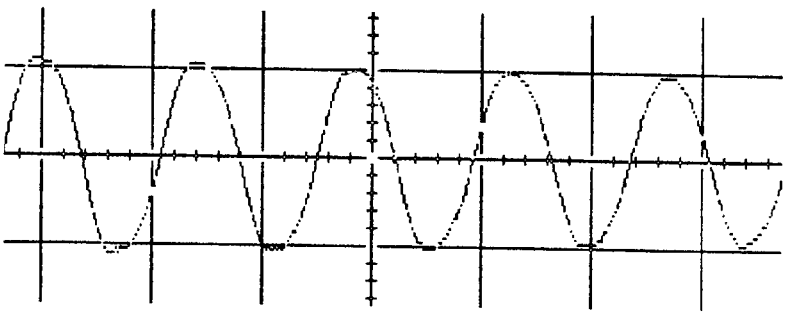
FIG. (8C)
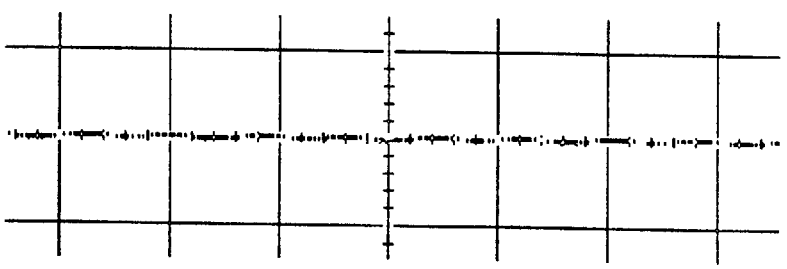
FIG. (8D)
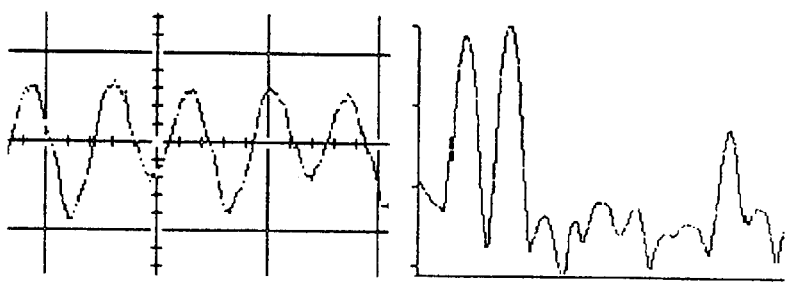
FIG. (8E)

TECHNOLOGY EXPLORER MODEL

BACKGROUND OF THE INVENTION

The present invention relates to both the field of education and demonstration, and the field of measuring and testing. More specifically, it relates to instrumented educational structural models; plug-in motion-sensing accelerometers; and fluidic structural strain gauges. Operation involves testing the behavior and monitoring the health of familiar structural models: a swing, a beam, and a free-fall rig, instrumented with novel motion and strain sensors.

Almost since the dawn of human thought, physical models have been created and employed to help explain, demonstrate, teach, and explore the wonders of nature and creation. Today, in our modern, computerized, information age, such models proliferate. Physical, mental, pictorial, graphical, symbolic, verbal, and virtual, models play a vital role in our highly industrialized society.

With the relatively recent advent of computers, and the development of a multitude of electronic sensors, instrumented structural models of such things as building, bridges, bones, machines, cars, and satellites now occupy much space and attract attention in our government, industrial and educational laboratories. A legion of busy scientists and technologists laboriously test and modify the behavior, and monitor the health of these structural models. A typical human task today might involve creating, testing, modeling and modifying the behavior of a structure to improve how it functions, feels, looks, sounds, interacts, or copes.

Of course, this enterprising situation also creates a need for educational and demonstration models to help educate and train students and workers, as well as the general public. To do a better job, workers need to further develop their natural testing talents and communicating skills, as well as to learn more about the automatic, interactive nature and behavior of things. Even ancient biblical wisdom encourages them to test all things, and retain what is good.

Just to reasonably cope in our modern technical society, people in general need to be more aware of important scientific endeavors, such as the space station, Freedom, which has undergone extensive behavior testing in model form, and to become more familiar with scientific testing methods and the basic universal technology involved.

In structural dynamics laboratories at major universities, sophisticated, instrumented, educational models now help students to naturally and interactively learn in a fun way by doing, testing, relating and repeating. Such models often employ various types of commercial sensors, such as capacitance, resistance, inductance and piezo-electric, to measure motion, force, pressure, sound, and other physical variables. But several perplexing problems still plague these structural models and the sensors involved.

Employing industrial components and designs, present educational structural models are usually quite expensive, difficult to adjust and operate, and inconvenient to instrument with sensors.

Older educational models fail to promote and demonstrate modern, universal, structural technology and terminology. For example, today sensors are structures, not mystical devices. Like humans, sensors employ structures and the natural energetic way that structures interact to sense and communicate information. And all of the technology and terminology taught in the university courses applies to the sensor structure as well as to that of the test object.

Expensive commercial and industrial sensors are usually not suitable for educational applications because of difficulties installing and removing them, especially on test objects requiring several sensors or an array of sensors. Bending or twisting the sensors instead of removing them in a prescribed linear way often damages delicate electrical pin connections or electrical cables.

Installing commercial motion sensors has always been an arduous, time consuming, precision task. Much time, money and research effort has been invested in developing improved mounting means, including stud, bolt, clamp, pad, adhesive, tape, wax, and magnets. Popular stud mounting, which mechanically clamps imperfect mating surfaces together into intimate contact has proven to be the best behaving method, although not always convenient or practical. Any interface irregularities or added interface structures modify the motion of the sensor, causing errors at higher frequencies of interest.

Highly perfected microphone technology offers a promising solution to low-cost, educational motion and strain sensors, especially in applications requiring very high sensitivity. But unsuccessful attempts over the past two decades to modify and convert low-cost, electret microphone structures into motion-sensing accelerometers have failed because of difficulty in attaching a small seismic mass to the flimsy diaphragm, usually made of an extremely thin, metalized plastic film. Any slight inadvertent force during assembly stretches and relaxes the taut diaphragm, rendering it useless for accelerometers.

BRIEF SUMMARY OF THE INVENTION

Accordingly, many of the above problems and difficulties are obviated by the present invention, which provides an educational structural model incorporating an easily adjustable, pendulous swing; an impact-actuated, free-fall test rig; and a strain-gauged cantilever beam; all instrumented with a low-cost, easy-to-install, electrostatic motion-sensor assembly, and all partially and economically made of a stiff, hard, compressible, elastic material.

In the free-fall rig, a falling actuator mass impacts a junction block to relax a flexible filament suspension line, which allows the instrumented test-object mass to fall freely for a brief interval of time, confirming Newton's famous Law of Motion, force equals mass multiplied by acceleration, or F=ma.

Somewhat surprisingly, in the adjustable swing assembly, sensor signals faithfully track the arcing motion of a glider-type swing, but not that of simple swing. This strange phenomena demonstrates what happens or doesn't happen when structures do not energetically interact. The compressible material in the swinging mass grips a one-piece, continuous loop, flexible, filament suspension line; holding the transformable swing in adjustable alignment with the frame of the educational structural model.

In the cantilever beam model, compression and expansion of a fluidic strain sensor converts the surface distortion of a vibrating beam into an oscillating, decaying signal for visual display on a monitoring instrument.

The low-cost, accelerating motion sensor involved conveniently plugs into or onto the test object or a mounting pad accessory, and intimately clamps imperfect interface mounting surfaces together with a residual compressive force, similar to a popular stud mount. Pressing and slightly twisting the sensor into a mounting hole compresses the elastic material in the vicinity of the interface, grips the test object to retain some of the compressive stress, and deflects enough to conform to irregularities in the mounting surface of the test object. After installing the compressible sensor with a slight twisting motion, it's quite difficult to pull it straight off.

Natural damping inherent in the hard-rubber body material reduces the tendency for sensitivity of the motion sensor to increase at higher frequencies. An external O-ring clamping the electrical cable to the body acts as a strain relief against any inadvertent forces tugging on the cable, Therefore, the primary object of this invention is to provide an instrumented, adjustable, educational, structural model for calibrating accelerometers; for demonstrating behavior-testing and health-monitoring of machinery technology; and for exploring the radiant, vibrant, automatic, communicative nature and behavior of energetically interacting things.

Another object of this invention is to physically demonstrate with familiar objects how through energetic interactions, which involve a transfer of energy, things function to transfer forces of nature into motion; how the behavior of a structure depends upon the way it transfers, converts, stores, or dissipates the energy involved; and how energetically interacting structures can be employed to sense and communicate information.

Still another object of this invention is to provide a low-cost motion sensor that quickly and conveniently installs by plugging into a hole or onto a post on a test object, mounting pad, or calibrator, whose motion is to be measured.

Still another object of the present invention is to provide a rugged motion sensor that can withstand student abuse, and will not be damaged by pulling, twisting or bending to remove it from the test object.

Still another object of the present invention is to provide a sealed motion sensor not appreciably affected by environmental moisture or humidity.

Still another object of the present invention is to convert low-cost, mass-produced, popular microphone cartridges into practical motion-sensing accelerometers by attaching a seismic mass to the diaphragm to enhance the inherent acceleration sensitivity.

Still another object of this invention is to provide a compatible, convenient, fluidic strain sensor that mechanically or adhesively installs on a surface of a test object.

BRIEF DESCRIPTION OF THE DRAWINGS

The novel features of the present invention are set forth in the appended claims. The structure of the educational model incorporating a swing, a free-fall object, a beam assembly, motion sensors, and a strain sensor; the manner of attaching the sensors to a test object; together with further objects and advantages can be best understood by referring to the following description in connection with the accompanying drawings, in which:

FIG. 8A is an illustrative plot of strain (ordinate) vs. time (abscissa) a vibrating cantilever beam on which the fluidic strain sensor is mounted.

FIG. 8B is an illustrative plot of acceleration (ordinate) vs. time (abscissa) for the free-fall motion of the test object mass.

FIG. 8C is an illustrative plot of acceleration (ordinate) vs. time (abscissa) for the motion of the glider swing.

FIG. 8D is an illustrative plot of acceleration (ordinate) vs. time (abscissa) for the motion of the simple swing.

FIG. 8E is an illustrative hybrid plot showing acceleration (left ordinate) vs. time (abscissa) for the motion of a misguided glider swing, and also showing to the right thereof the acceleration (right ordinate) vs. frequency (abscissa) for such misguided glider swing.

DETAILED DESCRIPTION OF THE INVENTION

Figure 1:
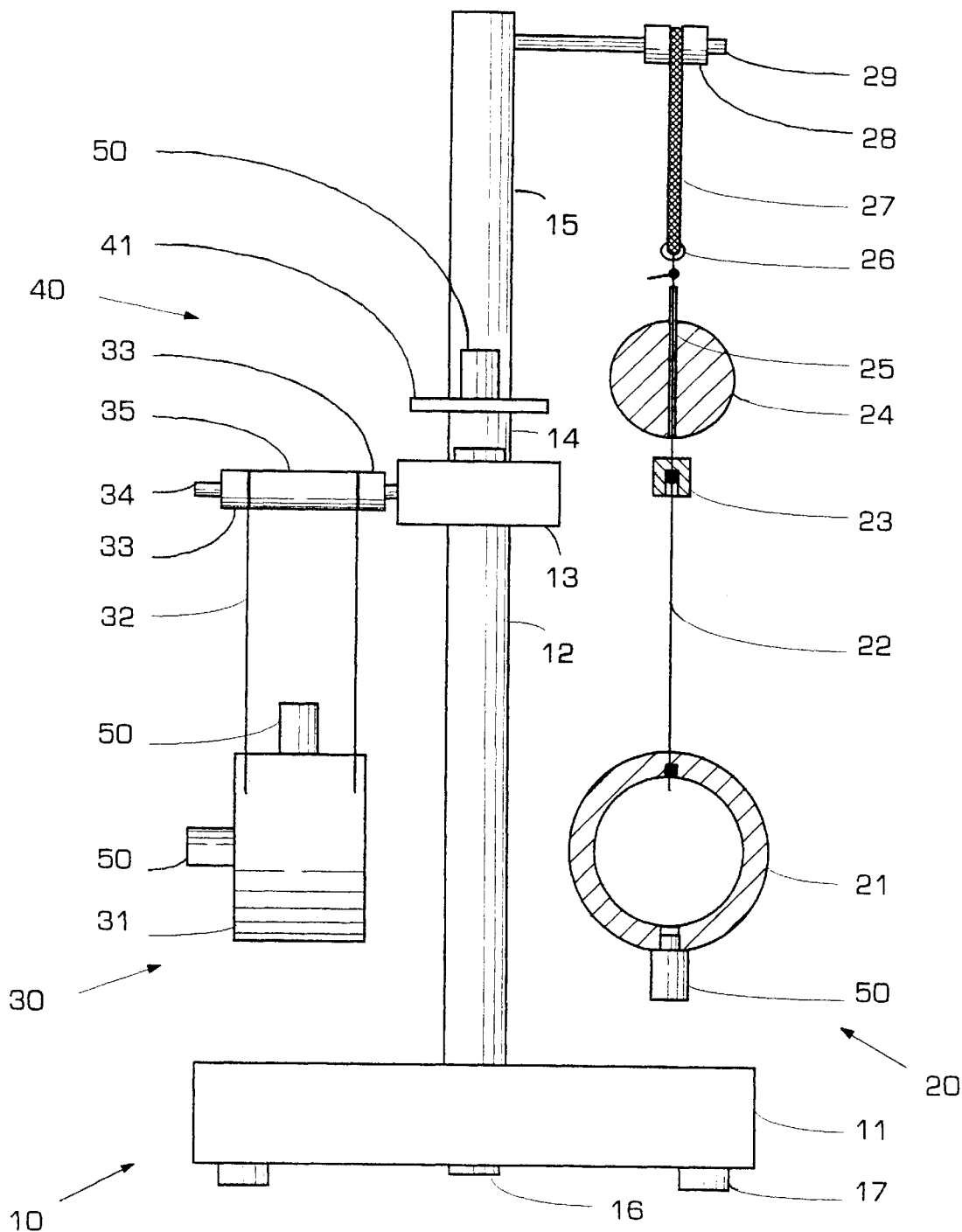
FIG. 1 is a drawing showing a side elevation view of the complete educational structural model assembly, with the free-fall rig sectioned to show design details.
Figure 2:
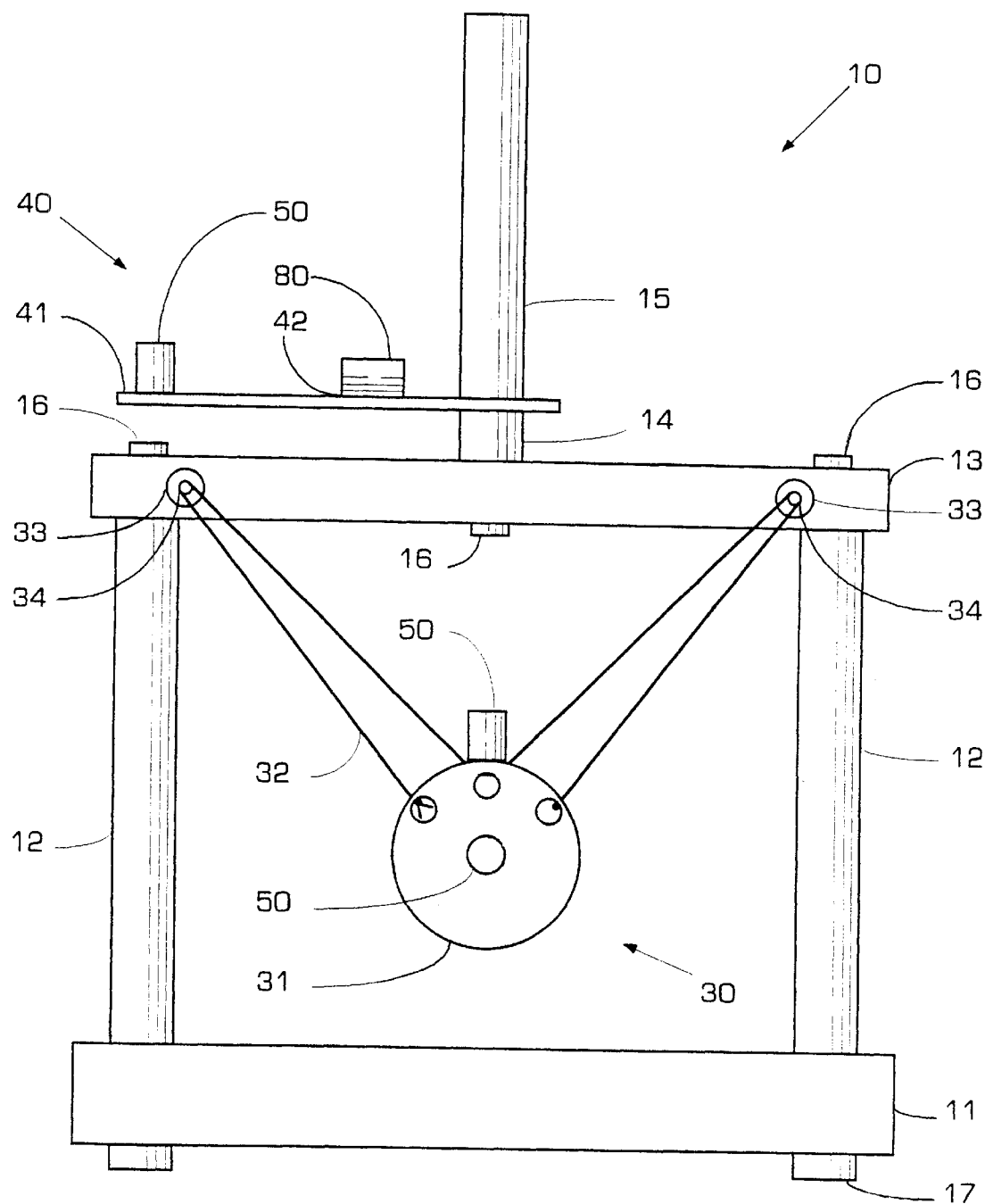
FIG. 2 is a drawing showing a partial front view of the educational structural model assembly; with two bushings removed to show the geometry of the suspension.

Referring to FIG. 1 and FIG. 2, which are different views of the same object, an instrumented structural model is illustrated, which is employed to explore, demonstrate and teach universal structural technology and terminology.

The part of the structural model in the general direction of arrow 20, illustrates a free-fall test rig, which includes a sturdy hardwood frame, a composite elastic suspension assembly, an actuator mass 24, and a free-fall mass 21 with a motion sensor 50 attached by plugging it into a hole. The free-fall mass 21 is a hollow ball made of a hard, plastic material. The actuator mass 24 is a hard rubber ball with a central hole and a plastic tube 25 installed to guide its decent. The composite elastic suspension consists of a band or loop of elastic, bungee-type cord 27 looped over the support rod 29, and a length of flexible filament fishing line 22, connected together by a plastic cable tie 26. Above a bulky knot retaining a small plastic junction block 23, the flexible line 22 is threaded through the central hole and plastic guide tube 25 in the actuator mass 24. Below the knot and junction block 23, the line 22 is fastened to the free-fall mass 21 by means of another bulky knot wedged into a stepped hole. Two hard rubber bushings, severally indicated at 28, position and retain the elastic cord 27 by firmly gripping the support rod 29 protruding from the column 15 of the assembled frame.

The wood supporting frame consists of a base 11 with two attached columns 12 supporting a fixed beam 13 mounting a spacer 14, a cantilever beam 41, the swing pivot rods 34, 34 and another column 15, to which the free-fall assembly is attached. Long flat-head connecting bolts 16 and thread inserts fasten together the various parts of the frame assembly. Rubber feet 17 cushion the base 11.

Manually lifting and dropping the actuator mass 24 causes it to impact the junction block 23 and relax the lower portion of the flexible suspension line 22, allowing the test mass 21 to fall freely for a brief interval of time, about 50 milliseconds.

The motion sensor 50 and associated instruments capture and display the event as a step increase in signal, where the flat plateau following the step represents a constant, one local "G" of acceleration. Adding an additional, auxiliary mass to the test mass and repeating the test does not change the signal.

These test results confirm the obvious: the farther an object falls, the faster it goes, and the harder it hits when stopped. They also confirm Newton's famous Law of Motion, F=ma (force equals mass multiplied by acceleration), since tests prove that the acceleration is the same when the ratio of force to mass is constant, as is the case with gravity. Test results also suggest a way of calibrating accelerometers by simply dropping them, and measuring the output signal for one local "G" of acceleration, which doesn't vary much from the standard value of 32.14 feet per second increase in speed each second (9.84 meters/second$^2$). Typically, this particular drop test method illustrates testing the behavior of a structure with impact excitation.

Referring again to FIG. 1 and FIG. 2, the part of the educational structural model in the general direction of the arrow 30, illustrates a pendulous swing assembly, which can be configured with parallel suspension arms as a glider-type swing, as illustrated, or as a simple swing by moving together the two separate pivots on each of the pivot rods 34. In addition, the swing mass 31 can be aligned or adjusted relative to the frame by sliding it on the flexible suspension line 32, which it firmly grips.

The swing assembly illustrated in the direction of arrow 30 includes two pivot rods 34 protruding from the wood frame; a one piece, continuous loop, flexible filament suspension line 32; a hard-rubber, compressible swing mass 31, and two motion sensors 50 plugged into to the swing mass 31. The "V" shaped, flexible suspension line 32 drapes around the pivot rods 34, and threads through tiny, near radial, pin holes and large axial holes in the swing mass 31. Near one face of the swing mass 31, the line 32 exits the mass 31 at the left axial hole, drapes around the left pivot rod 34, goes back into and out of the mass 31 at the center axial hole, wraps around the other pivot rod 34, then goes back into the mass and through the right axial hole to the other face, where the pattern repeats. Eventually the two ends of the one-piece line 32 meet and tie together inside the left axial hole of the mass 31, where the journey began. At the pivot rods 34, the line 32 is clamped between hard rubber spacers 35 and bushings 33 tightly gripping the pivot rods 34.

Manually lifting and releasing, or pushing the swing mass 31 to energize it causes the mass 31 to freely swing back and forth at a natural rate, about once per second, while air resistance gradually reduces the excursion. Somewhat surprisingly, adding an additional auxiliary mass to the swing mass 31 does not change this motion nor the sensor signals.

During operation and testing, sensor signals faithfully track the arcing motion of the glider-type swing, but not the motion of the simple swing. The simple swing does not generate any signal because there is no energetic interaction, no transfer of energy between the sensor 50 and the swing mass 31. Through energetic interaction with the Earth, gravity moves both objects. Tracking the arcing motion of the glider swing by displaying the horizontal and vertical motion signals in an X/Y fashion on the monitor builds confidence in the instruments. The arcing motion of the display resembles the mouth of a happy face graphic. Reversing the vertical signal polarity or the mounting of the vertical motion sensor 50 changes the smile into a frown. Misalignment of the glider swing relative to the frame causes uneven peaks and valleys in the vertical motion signal, which can be corrected by adjusting the swing mass 31 on its suspension line 32. Checking for misalignment is a typical health monitoring task.

Figure 3:
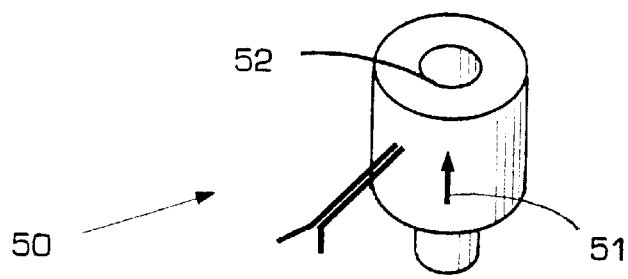
FIG. 3 is a perspective view of a motion sensor incorporating the compressive, plug-in mounting means of the present invention.

Referring to FIG. 3, in the general direction of the arrow 50, a motion sensor is illustrated, which is employed to measure a component of the acceleration aspect of motion along its central, sensitive axis, indicated by an arrow 51. The device contains an internal, modular, transducer module 53 in the form of an electrostatic, variable capacitance type motion sensor 53, which generates an electrical output signal faithfully following the vibratory motion of the test object to which it is attached.

Figure 4:
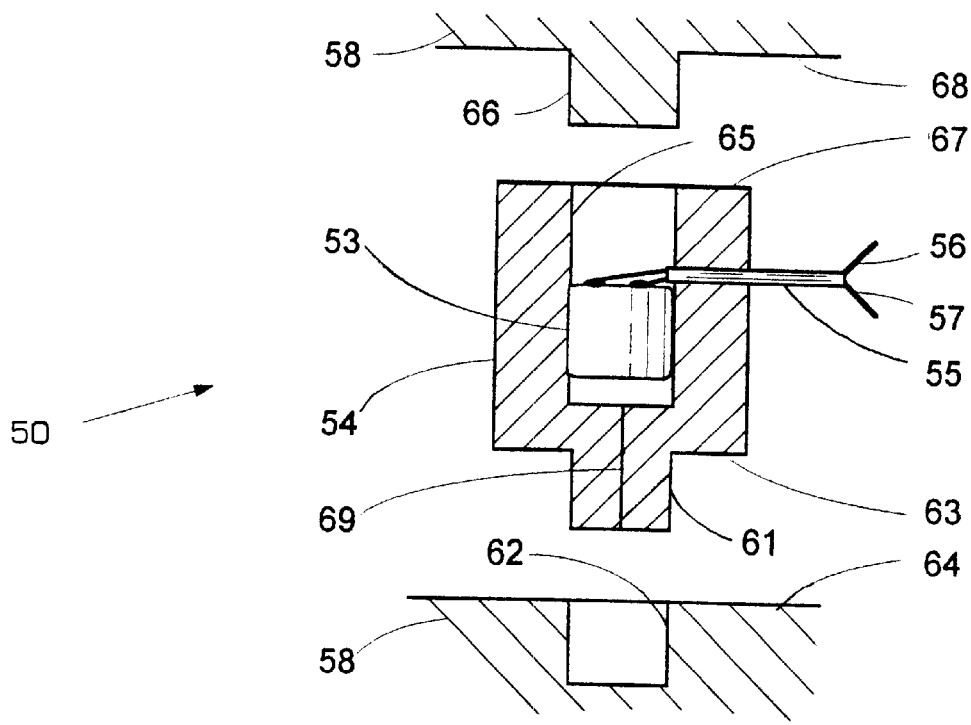
FIG. 4 is a cross-sectional drawing of the construction of a motion sensor according to the present invention for measuring the acceleration aspect of motion along its sensitive axis.

Referring to FIG. 4, a cross-sectional drawing illustrates the construction of the state-of-art motion-sensing accelerometer 50 pictured in FIG. 1. This unusual motion sensor 50, includes a sensing module 53 housed in a stiff, hard rubber body 54 having both a hole 65 and a post-like projection 61 for attachment to a test object or to a mounting pad accessory 58 by gripping either a post 66 or the walls of a hole 62, and holding compressed mating interface surfaces 63 and 64, or 67 and 68, in intimate contact. The behavior of this quick, simple pug-in installation resembles that of a popular, threaded, stud mounting means of the highest integrity.

Facilitating convenient plug-in assembly, a slight interference fit of one thousand of an inch between the sensing module 53, and the stiff, hard rubber body 54 accurately holds the sensing module 53 in alignment with the mounting surfaces 63 and 67, without the use of adhesives. A collapsible, vent pin-hole 69, allows air to escape from the inner chamber through a hollow-needle tool during assembly. An undersized hole in the body of the sensor grips and seals the pigtail cable assembly 55, providing strain relief for the cable.

Firmly pushing and twisting the protruding sensor post 61 into a cylindrical hole 62 results in a strong, adequate, holding force for most applications. However, a compressible annular ridge or bead on the end of the sensor mounting post 61 fitting a similar shaped groove near the bottom of the test object hole 62 would lock the two piece assembly together even more securely.

Referring to FIG. 4, during installation when the motion sensor 50 is plugged into or onto the test object 58, the force required to overcome the interference fit between the post 61 and hole 62 generates stresses in the elastic body 54 of the sensor 50, and in the test object 58. The resulting radial compressive stress in the post 61 clamps it to the walls of the hole 62. When the installing force is released and the compressive stresses relax somewhat, axial tensile stress develops in the post 61, holding the mating mounting surfaces 63 an 64 together in intimate contact with residual compression. During operation, the residual compressive stress at these interface surfaces ensures the faithful transmission of motion from the test object 58 to the sensor structure 50. In a similar way, residual compressive stresses in the body of the sensor 54 securely lock the sensor 50 to the test object 58, when using the alternative, hole mounting means 65 to install the sensor on a rigid post 66.

The dynamic behavior of the sensor 50 with its compressive mounting means is adequate for most educational and structural behavior testing applications. With low mass, high stiffness, and good internal damping, the assembly provides a reasonably flat response over a wide frequency range, typically from one to above 1,000 Hertz, which means that within that range the sensor treats all frequencies nearly the same. In other words, within the range of interest, the sensor generates essentially the same output signal amplitude for the same input motion, regardless of frequency. Behavior tests of the sensor with this educational, structural model confirm that the motion sensor 50 adequately follows a one-millisecond rise-time, step increase in acceleration lasting about 50 milliseconds, without appreciable overshoot, ringing, or decay.

The motion sensor assembly 50 also conveniently installs in a mounting pad 58 attached to a test object with an adhesive. Commercially available, adhesive-mounted, hard-rubber bumpers with an added central hole 62 provide a convenient installation for many applications.

A conventional accelerometer with a threaded hole in its base can be mounted in a similar plug-in way with a hollow cylinder of hard, compressible material bolted to its base, instead of a stud. Tightening the screw expands the compressible cylindrical post to tightly fit in the mounting hole.

Figure 5:
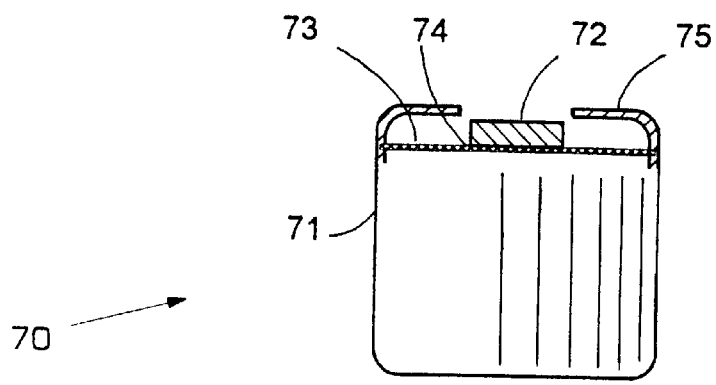
FIG. 5 is a partial cross-sectional drawing of a modified microphone having a mass attached to its diaphragm to increase its inherent sensitivity to accelerating motion.

Referring to FIG. 5, the sensing module 70 is an electrostatic, electret type microphone with a small metallic mass 72 attached to its taut diaphragm 73 with a minute amount of a permanent, stiff, viscous fluid 74, such as silicon grease. To avoid damaging the delicate, metalized, plastic-membrane diaphragm 73 during assembly, the silicone grease 74 is first applied to the flat interface surface of the mass 72, before it is delicately dropped onto the diaphragm 73. Then the assembly is vibrated to firmly seat the mass 72 in place. This mechanical/chemical way of attaching the mating parts together withstands severe transverse shocks as well as moderately high temperatures.

Implementing Newton's famous Law of Motion, force equals mass times acceleration, or F=ma, this motion-sensing accelerometer module is structured with a mass-loaded spring in the form of an elastic diaphragm 73, and an electrical, variable-capacitance sensing element to measure its deflection. The accelerometer module 70 measures the force required to automatically give its internal seismic mass 72 the same motion as the test object to which its case 71 is attached. Tilting the sensitive axis of the accelerometer from horizontal to vertical essentially weighs its seismic mass on the spring type scale.

For measuring accelerations in orthogonal directions, two or three of the modular sensing capsules 70 readily house in a similar hard-rubber body with their sensitive axes aligned perpendicular to each other. Such biaxial or triaxial assemblies attach to the test object in the same way as a single-axis sensor 50, employing either a plug or hole with an interference fit and residual stresses.

Mounting or bonding two such sensor modules 70 together, face-to-face in a common housing creates a well known, differential-mode sensor, whereby one signal increases while the other decreases when the sensor is accelerated. Operating in this sophisticated differential mode doubles the sensitivity, improves linearity, and rejects common-mode noise. A small dab of silicone grease applied between the two masses 72 of a differential mode sensor bonds them together mechanically, and stiffens the structure of the moving assembly to transverse disturbances. Such a fluidic connecting means avoids a difficult dimensional tolerance problem trying to exactly fit a solid mass between two fixed diaphragms, which move only a few ten-thousandths of an inch during operation. Two motion sensors, 50, one mounted in each face of the swing mass, demonstrate differential-mode operation.

Other type modular sensing modules, such as piezoelectric, resistive, or inductive would work just as well in the compressible housing 54 of FIG. 4. Such sensing modules with internal, microelectronic, integrated-circuit, isolation amplifiers operating over two wires 56 and 57 conducting both signal and power are sometimes called "smart sensors."

Figure 6:
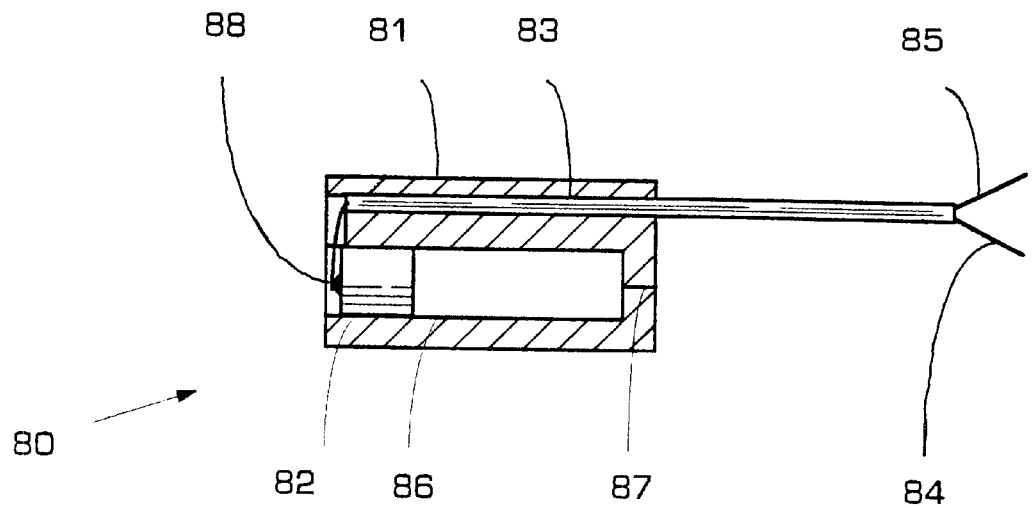
FIG. 6 is a cross-sectional drawing of the construction of a fluidic strain sensor.
Figure 7:
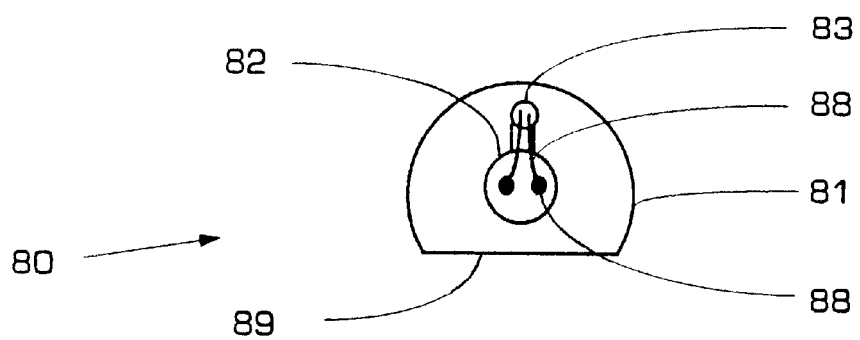
FIG. 7 is a drawing showing an end view of the fluidic strain sensor having a near cylindrical shape.

Referring to FIG. 6, in the general direction of the arrow 80, a fluidic strain sensor is illustrated, which is employed to measure the surface strain of a stressed mechanical structure, such as the cantilever beam 41 to which it is adhesively attached. The drawing illustrates the construction of the fluidic strain sensor 80 pictured in FIG. 2. This strain sensor 80 includes an electronic pressure sensing module 82 housed, clamped, and sealed within an elastic body 81 made of a hard, compressible material, and exposed to the pressure in an elongated, sealed, internal chamber 86. To prevent a pressure build-up during assembly, a small, collapsible pin hole 87 formed by a hollow needle vents the inner chamber during assembly. A flat, two-wire 84 and 85, ribbon cable 83 clamped by an undersize hole in the compressible housing 81 connects the sensing module terminals 88 and to an external signal and power conditioning circuit. A conical exit hole or strain-relieving tubing prevents the two wire cable 83 from bending sharply. Referring to FIG. 7, a flat or conformal surface 89 on the elastic body 81 attaches to the test object surface by means of an adhesive or mechanical fasteners.

Referring to FIG. 2, distortion of the mounting surface of the cantilever-beam test object 41 in the direction of the longitudinal axis of the sensor 80 shortens or stretches the sensor chamber 86, which compresses or expands the air in the chamber 86, changes its pressure, and generates a corresponding electrical output signal. Thus the net result is a very sensitive, low-cost, convenient, fluidic strain sensor 80 compatible with the external electronics of the electrostatic motion sensor 50, and electrostatic microphones.

The strain-instrumented, cantilever beam assembly 40 incorporates and models the basic spring and deflection sensing elements of a conventional force sensor. With an auxiliary mass, such as sensor 50, attached near its tip, this electromechanical structure also serves as a seismic accelerometer model, sensitive to disturbances such as tapping on the base 11 of the frame. A motion sensor 50 near the tip of the beam 41, provides a means for calibrating the strain sensor 80 by measuring the tip deflection of the beam and calculating the stress near the base.

Therefore, the creative concepts in the present invention provide a practical, useful, low cost, instrumented, educational, desktop structural model incorporating and promoting state-of-the-art technology for exploring, demonstrating, and teaching universal technology in a fun way. This technology explorer serves as a valuable teaching and training accessory for expanded computers acting as virtual oscilloscopes and spectrum analyzers.

I claim:

1. A freely falling educational device comprising:

a frame;

an elastic member having an upper end connected to said frame;

a line having an upper end connected to the lower end of said elastic member;

a test object connected to the lower end of said line;

a junction block connected to an intermediate portion of said line;

an actuator mass mounted for guided movement along said line between said upper end and said junction block;

an acceleration sensor attached to said object;

whereby said actuator mass may be lifted vertically away from said junction block, and thereafter dropped to impact and displace said junction block, relaxing lower portion of said line below said junction block, permitting said object to fall freely for an interval of time, and said motion sensor to generate a motion signal.

2. A device set forth in claim 1 wherein said sensor is a microphone having a mass attached to its diaphragm with grease.

* * * * *